(12) United States Patent
Tyagi et al.

(10) Patent No.: US 9,209,625 B2
(45) Date of Patent: Dec. 8, 2015

(54) METHOD AND SYSTEM TO CO-OPTIMIZE UTILIZATION OF DEMAND RESPONSE AND ENERGY STORAGE RESOURCES

(75) Inventors: Rajesh Tyagi, Niskayuna, NY (US); Rayette Ann Fisher, Niskayuna, NY (US); Jason Wayne Black, Dublin, OH (US)

(73) Assignee: General Electric Company, Niskayuna, NY (US)

( * ) Notice: Subject to any disclaimer, the term of this patent is extended or adjusted under 35 U.S.C. 154(b) by 825 days.

(21) Appl. No.: 13/451,851

(22) Filed: Apr. 20, 2012

(65) Prior Publication Data

US 2013/0282193 A1 Oct. 24, 2013

(51) Int. Cl.
*G05D 17/00* (2006.01)
*H02J 3/28* (2006.01)
*H02J 3/00* (2006.01)

(52) U.S. Cl.
CPC . *H02J 3/28* (2013.01); *H02J 3/008* (2013.01); *Y04S 50/10* (2013.01)

(58) Field of Classification Search
CPC .......................................................... H02J 3/00
USPC .......................................................... 700/291
See application file for complete search history.

(56) References Cited

U.S. PATENT DOCUMENTS

| 2004/0162642 A1* | 8/2004 | Gasper et al. ............... 700/286 |
| 2007/0005192 A1 | 1/2007 | Schoettle et al. |
| 2010/0017045 A1 | 1/2010 | Nesler et al. |
| 2010/0088261 A1 | 4/2010 | Montalvo |
| 2011/0153102 A1 | 6/2011 | Tyagi et al. |
| 2011/0231028 A1 | 9/2011 | Ozog |
| 2011/0258018 A1* | 10/2011 | Tyagi et al. ............... 705/7.33 |
| 2012/0296482 A1* | 11/2012 | Steven et al. ............... 700/291 |

OTHER PUBLICATIONS

Kintner-Meyer et al., "Energy Storage for Variable Renewable Energy Resource Integration—A Regional Assessment for the Northwest Power Pool (NWPP)", IEEE PES Power Systems Conference & Exhibition (PSCE), Mar. 20-23, 2011, pp. 1-8, Phoenix, Arizona.

Khosrow Moslehi et al., "Smart Grid—A Reliability Perspective", IEEE PES Conference on Innovative, Jan. 19-20, 2010, pp. 1-8, Washington, D.C.

(Continued)

*Primary Examiner* — Mohammad Ali
*Assistant Examiner* — Yuhui R Pan
(74) *Attorney, Agent, or Firm* — John P. Darling

(57) ABSTRACT

Method and system to provide co-optimized utilization of demand response and energy storage resources in an electrical grid system. The system may include a module to evaluate a marginal savings relative to a dispatch cost, if a demand response event is performed. The system may further include a module to evaluate a marginal savings relative to the dispatch cost, if an energy storage event is performed, and a controller including circuitry may be configured to determine a control strategy to perform a dispatch including a demand response event and/or an energy storage event, based at least in part on the respective marginal savings of the demand response event and/or the energy storage event, which may be selected to co-optimize an integrated utilization of the demand response and energy storage resources to meet a given objective.

23 Claims, 7 Drawing Sheets

(56) References Cited

OTHER PUBLICATIONS

Yutaka Ota et al.,"An autonomous distributed vehicle-to-grid control of grid-connected electric vehicle", International Conference on Industrial and Information Systems (ICIIS), Dec. 28-31, 2009, pp. 414-418, Sri Lanka.

Michael Stadler et al., "Integrated building energy systems design considering storage technologies", Ernest Orlando Lawrence Berkeley National Laboratory—Environmental Energy Technologies Division, Apr. 2009, pp. 1-16, Berkeley, CA.

Gang Xiong et al., "Smart (In-home) Power Scheduling for Demand Response on the Smart Grid", Innovative Smart Grid Technologies (ISGT), 2011 IEEE PES, Jan. 17-19, 2011, pp. 1-7, Bethlehem, PA.

Na Li et al., "Optimal Demand Response Based on Utility Maximization in Power Networks", Power and Energy Society General Meeting, 2011 IEEE, vol., no., pp. 1-8, Jul. 24-29, 2011, Pasadena, CA.

GE Energy, "GridThe Smart Grid . . . Lunch and LearnSession 4: The Smart Grid—The Transmission View", pp. 1-50, http://www.usea.org/USEA_Events/Smart-Grid-Briefings/Session_4-The_Smart_Grid-The_Transmission_View.pdf, Jun. 4, 2009, USA.

Tarek El-Fouly, "Case Studies and Benchmarking: Canadian DER Integration Projects", Workshop: Smart Grid Demo Project Reviews, Natural Resources Canada, pp. 1-26, Dec. 6-10, 2010, Albuquerque, USA.

* cited by examiner

METHOD AND SYSTEM TO CO-OPTIMIZE UTILIZATION OF DEMAND RESPONSE AND ENERGY STORAGE RESOURCES

FIELD OF THE INVENTION

The present invention is generally related to electrical grid systems, and, more particularly, to co-optimized utilization of demand response and energy storage resources in an electrical grid system.

BACKGROUND OF THE INVENTION

Demand response (DR) refers to programs used to encourage/induce utility consumers to curtail or shift their demand of electricity at particular times in order to reduce aggregate utility demand. For example, electric utilities may employ demand response resources to reduce peak demand for electricity. Demand response programs typically offer customers economic incentives for agreeing to reduce their demand at certain times.

Utilities may also consider use of energy storage resources to increase the amount of electricity supplied during a period of peak demand. It is believed that to date, utilities generally use non-integrated (e.g., ad hoc) approaches regarding when to invoke a DR event versus when to invoke an energy storage event to co-optimally meet a desired load reduction. It will be appreciated that such approaches do not provide the utilities with a control strategy, which would be conducive to cost-effective co-utilization of DR and/or storage resources so that a utility's economic gains, savings, and/or other criteria may be co-optimized. Accordingly, it is desirable to provide further improvements regarding strategies for the utilization of DR and storage resources.

BRIEF DESCRIPTION

Aspects of the present invention may be fulfilled by a method to provide co-optimized utilization of demand response and energy storage resources in an electrical grid system. The method may allow obtaining a grid system load; estimating a dispatch cost in connection with the grid system load; evaluating a marginal savings relative to the dispatch cost, if a demand response event is performed; evaluating a marginal savings relative to the dispatch cost, if an energy storage event is performed; determining a control strategy to perform a dispatch comprising a demand response event and/or an energy storage event, which is selected to co-optimize an integrated utilization of the demand response and energy storage resources to meet a given objective based at least in part on the respective marginal savings of the demand response event and/or the energy storage event. The control strategy may be further based on parameters indicative of an aggregate of hybrid operational capabilities resulting from the integrated utilization of the demand response and energy storage resources relative to the given objective; and performing a dispatch consistent with the determined control strategy.

Aspects of the present invention may also be fulfilled by a system to provide co-optimized utilization of demand response and energy storage resources in an electrical grid system. The system may comprise a module to obtain a grid system load; a module to estimate a dispatch cost in connection with the grid system load; a module to evaluate a marginal savings relative to the dispatch cost, if a demand response event is performed; a module to evaluate a marginal savings relative to the dispatch cost, if an energy storage event is performed; a controller comprising circuitry may be configured to determine a control strategy to perform a dispatch comprising a demand response event and/or an energy storage event, which is selected to co-optimize an integrated utilization of the demand response and energy storage resources to meet a given objective based at least in part on the respective marginal savings of the demand response event and/or energy storage event. The control strategy may be further based on parameters indicative of an aggregate of hybrid operational capabilities resulting from the integrated utilization of the demand response and energy storage resources relative to the given objective; and a module to perform a dispatch consistent with the determined control strategy.

BRIEF DESCRIPTION OF THE DRAWINGS

The invention is explained in the following description in view of the drawings that show.

DETAILED DESCRIPTION OF THE INVENTION

Figure 1:
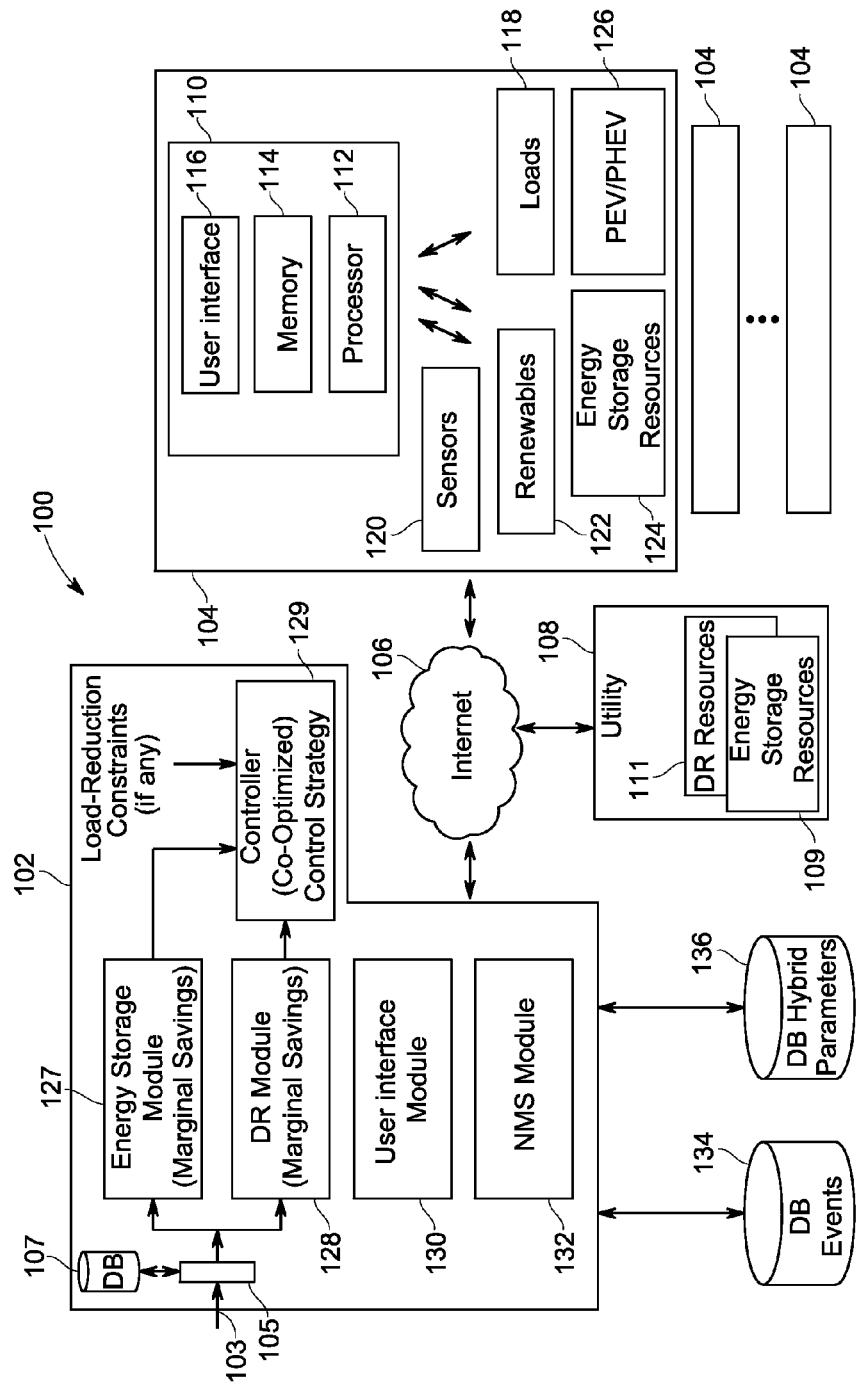
FIG. 1 is a top-level schematic of an example electrical grid system, which may benefit from aspects of the present invention, as may be used to provide co-optimized utilization of demand response and energy storage resources.

Example embodiments described herein may be directed to a system and method that, for example, may enable utilities to co-optimize an integrated use of demand response (DR) (e.g., curtailment events to mitigate peak load conditions) and energy storage resources, such as may be used to supply electrical energy, which may also be used to mitigate such peak load conditions, or other conditions that require load reductions, such as contingencies. Examples of energy storage resources may include electrochemical resources, (e.g., batteries, flow batteries); mechanical resources (e.g., compressed air energy storage, hydraulic accumulator, hydroelectric energy storage; flywheel devices); electrical resources (e.g., capacitors, supercapacitors, superconducting magnetic energy storage (SMES)). While example embodiments of the invention will be described in the context of energy or electric utilities and power grid operations, it will be appreciated by those skilled in the art that a system and method embodying aspects of the present invention may be used for other purposes or utilities as well. As used herein, the term "module" (or "circuitry") may refer to software, hardware, firmware, or any combination of these, or any system, process, structure or functionality that may perform or facilitate the processes described herein.

Demand response programs, such as critical peak pricing (CPP), Variable Peak Pricing (VPP), Direct Load Control (DLC), and other various incentive-based programs are examples of demand response resources with contractual specifications as to when, how often, and the duration that a utility can invoke a demand response event for a participating customer. For example, a contract may specify that the utility can invoke just a limited number of events per year (e.g., up to 15 events per year), where each event can occur between a defined time period of the day (e.g., between the hours of 12 pm and 6 pm) with a maximum number of total hours per year, (e.g., a maximum of 60 total hours per year) and/or a maximum number of hours per event (e.g., a maximum of 6 hours per event). Thus, in this example, the utility can choose to use 10 events of 6 hours each, or 15 events of 4 hours each, or any other such combination of events and hours to stay within the 15 event, 60 hour limitations for each customer.

Because of the limited number of demand response events that may be allowable, utilities tend to use such events judiciously and only when a utility can expect a substantial savings in energy cost. One approach may be to invoke a demand response event just for a partial set of customers so that in effect the utility is able to reduce the peak load on more occasions while keeping within the applicable number of events per year limit for each customer. For example, by classifying the subscribing customers into different groups (e.g., four groups) and calling only a given group on a given day that a DR event is invoked, one may be able to reduce peak load a total of 60 different times (in lieu of just the 15 times given in the foregoing example) and still keep within contractual limits.

Aspects of the present invention involve integrated co-optimization of demand response and energy storage resources. For example, energy storage resources (e.g., batteries) may be recharged during low load periods and discharged during peak load periods. Let us describe some considerations, which may apply to energy storage resources, such as batteries. For example, batteries may gradually become less efficient in energy conversion with each charge/discharge cycle. Thus, one can associate a usage cost with each cycle, and this cost may vary from one cycle to the next. Another consideration may be that batteries tend to gradually lose their respective charges, if not timely used. Accordingly, a charging event should be performed when one can estimate that a discharging event is likely to be performed in a relatively proximate time horizon. Data indicative of such considerations may be appropriately processed essentially in real time with data indicative of energy costs, which can fluctuate from day-today and from hour-to-hour, to dynamically estimate the cost of charging an energy storage resource (e.g., a battery) to an appropriate state of charge (SOC). Similarly, a generation savings, which may accrue from peak reductions, may also be dynamically estimated and in this manner one may be able to dynamically estimate a net savings, which may result if a DR event and/or an energy storage event (e.g., a charge/discharge cycle) is performed. For example, generation dispatch cost savings less costs from an energy storage event, such as ownership cost and charging cost to replenish the energy storage device during an off-peak period.

When one considers utilization of a resource made up of DR and energy storage resources, one has a choice of a DR event, an energy storage event, or some combination thereof. It will be appreciated, that absent a system or method embodying aspects of the present invention, such a choice would not be readily determined since the savings or benefits from the two resources may involve different factors. For example, the benefit from a DR event may be determined by the peak load reduction resulting from a response profile of the participants, which in turn may be influenced by factors, such as daily temperature, humidity, etc. It will be appreciated that while batteries can also effectively reduce peak load, the benefits in this example case may also be derived from savings resulting from the fact that one may recharge the batteries at a relatively lower rate compared to the peak rates, which can be substantially higher during peak periods.

FIG. 1 is a top-level schematic of an example electrical grid system 100, which may benefit from aspects of the present invention, as may be used to provide co-optimized utilization of demand response and energy storage resources, which may be available in system 100.

In one example embodiment, system 100 may include an energy management server 102, a plurality of customer sites 104, and a utility 108, which may include energy storage resources 109 and DR resources 111. To facilitate description, a single server 102 and a single utility source 108 are shown in FIG. 1. However, it should be understood that practical embodiments of the invention are not limited to any specific number of parties, since it should be appreciated that, for example, there can be any number of energy management servers, customer sites, service providers, and control centers in a grid system. It will be appreciated that energy management server 102 may be arranged at and/or hosted by utility 108 and/or by any other party.

Each customer site 104 may include an energy manager 110 having a processor 112, a memory 114, and a user interface 116, such as may include a keyboard or touch screen, for example, along with a display. Processor 112 may execute programs for monitoring and controlling operation of various customer devices, such as electric loads 118, sensors 120, renewable 122, energy storage resources 124, and plug in electric vehicles (PEV) or plug in hybrid electric vehicles (PHEV) 126. Sensors 120 may include electric meters, thermostats, occupancy sensors, humidity gauges, and other such devices. Renewable resources 122 may include solar and/or wind power devices, for example. Processor 112 may control the various components using any of a number of interfaces or protocols including Zigbee, Z-Wave, WiFi, or Homeplug, for example. Communication between customer sites 104, server 102, and utility 108 may occur via a WAN (e.g., Internet) 106, WiMAX, broadband, AMI, and/or power line carriers, for example. Communication can also occur via a private network. It will be appreciated that any suitable communication system may be used for data communication among the parties.

Energy management server 102 may include a module 105, which may estimate a dispatch cost in connection with a grid system load 103. For example, the dispatch cost may be estimated from energy supply cost curves stored in a database 107. An energy storage module 127 may be used to evaluate a marginal savings relative to the dispatch cost, if an energy storage event is performed. A demand response (DR) module 128 may be used to evaluate a marginal savings relative to the dispatch cost, if a demand response event is performed. A controller 129, as may include appropriate circuitry, may be configured to determine a control strategy to perform a dispatch made up of a demand response event, an energy storage event, or both. That is, a demand response event and/or an energy storage event, which may be selected to co-optimize an integrated utilization of demand response resources 111 and energy storage resources 109, 124 to meet a given objective based at least in part on the respective marginal savings of the demand response event and/or the energy storage event.

In one example embodiment, the control strategy may be further based on parameters, (e.g., demand response and energy storage parameters) which may be stored in a database 136 and may be indicative of an aggregate of hybrid operational capabilities resulting from the integrated utilization of the demand response energy storage resources relative to the given objective. For example, the energy storage resources may include at least some energy storage resources (e.g., certain batteries), which may be suitable for applications involving a discharge over a period of hours with a similarly long period for recharging (e.g., one charge/discharge cycle per day) while other types of batteries may be suitable for a relatively fast discharge over a period of seconds or minutes, which may involve multiple cycles per day. Similarly, the respective response of each DR group may have its own operational capabilities, which may appropriately complement the operational capabilities of the energy storage resources relative to the specific requirements of the given objective.

An events database 134 may be used to store historical data of events, such as demand response events and energy storage events, which may have been performed in accordance with the control strategy. The historical data can include information on customer utility usage including load type, time of use (TOU), duration of use, shed or demand response events, and energy storage charge/discharge, for example. In addition, the database 134 stores event data for each customer site. More specifically, the database 134 stores historical information on whether a customer site participated in a demand response event, the start time and end time, day of week, season, etc. In addition, the amount of load reduction and rebound may be stored in database 134. Data related to response forecasting and expected future benefit calculations may also be stored in database 134.

Energy management server 102 may further include a Network Management Services (NMS) Module 130, a user interface module 132. NMS module 130 may provide communication management between server 102, customer sites 104 and utility 108. User interface module 132 may provide information to an operator. The description below will proceed to describe structural and/or operational relationships, which may be performed by the controller and at least some of the components shown in FIG. 1

Figure 2:
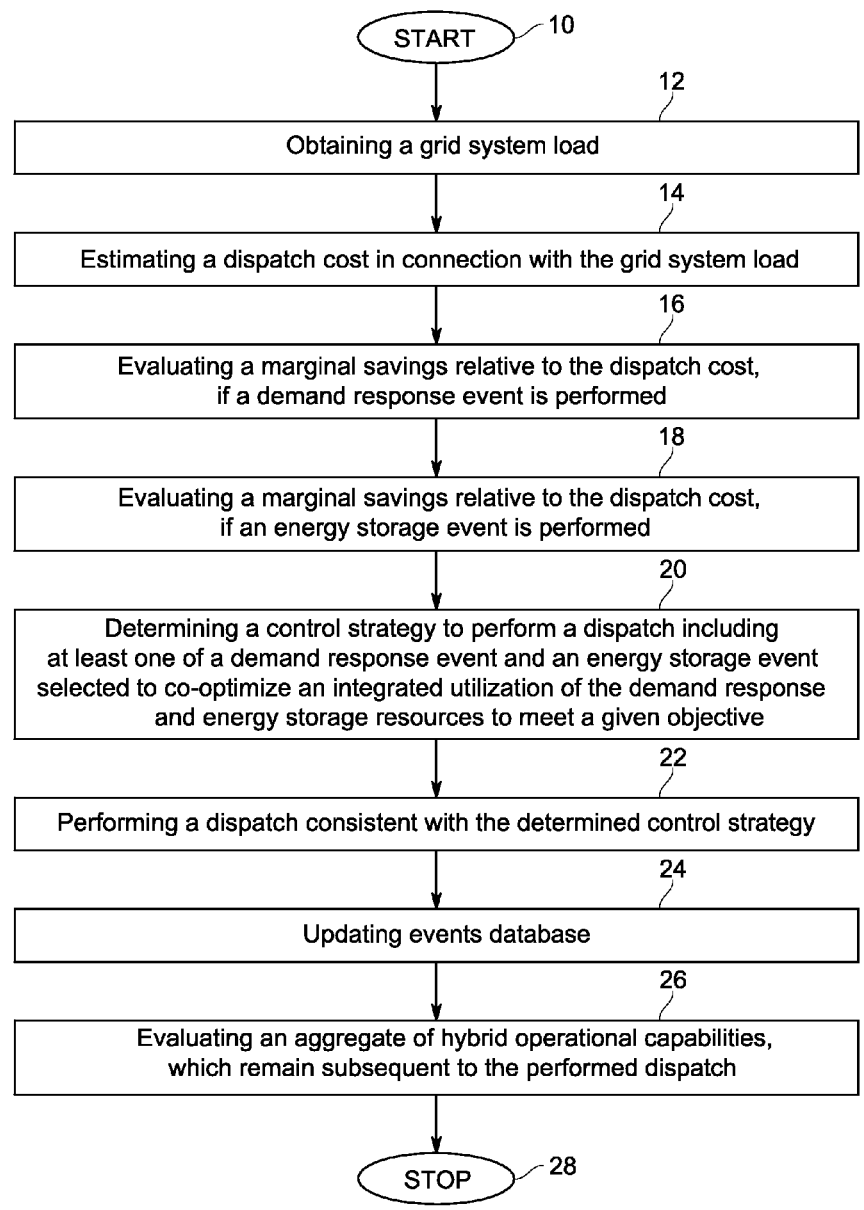
FIGS. 2-5 illustrate respective flow diagrams, which may be used for describing example methodologies embodying aspects of the present invention.

FIG. 2 is a flowchart of a method embodying aspects of the invention, as may be used to provide co-optimized utilization of demand response and energy storage resources in an electrical grid system. Subsequent to start step 10, step 12 allows obtaining a grid system load. For example, the grid system load may be forecasted, estimated, or otherwise obtained. Step 14 allows estimating a dispatch cost in connection with the grid system load. For example, the dispatch cost may be estimated from energy supply cost curves. It will be appreciated that in a practical embodiment, both the grid system load and corresponding dispatch costs may comprise a sequence of time-varying values, such as hourly values over a 24 hour period.

Step 16 allows evaluating a marginal savings relative to the dispatch cost, if a demand response event is performed, and step 18 allows evaluating a marginal savings relative to the dispatch cost, if an energy storage event is performed. Step 20 allows determining a control strategy to perform a dispatch made up of a demand response event, an energy storage event or both. That is, a demand response event and/or an energy storage event may be selected to co-optimize an integrated utilization of the demand response and energy storage resources to meet a given objective based at least in part on the respective marginal savings of the demand response event and/or the energy storage event. In one example embodiment, the control strategy may be further based on parameters, (e.g., demand response and energy storage parameters) which may be indicative of an aggregate of hybrid operational capabilities resulting from the integrated utilization of the demand response energy storage resources relative to the given objective.

In one example embodiment, the given objective may be a maximization of total savings in connection with the performed dispatch. In another example embodiment, the given objective may be a maximization of total savings in connection with the performed dispatch subject to at least one or more load-reduction constraints, such as a ramping rate, a defined load shape or limit, or a combination of the foregoing constraints.

Figure 6:
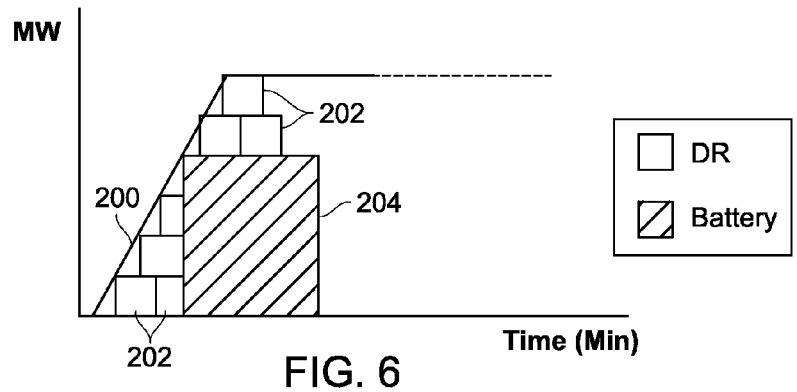
FIGS. 6-8 illustrates respective graphs of example load reductions, which may be subject to respective constraints, and which may be met thru co-optimized utilization of demand response and energy storage resources.

FIG. 6 illustrates a graph where the example objective may include a maximization of total savings subject to a ramping rate constraint 200. In this case, demand response events 202 and energy storage event 204 are selected to meet this given objective and ramping rate constraint.

Figure 7:
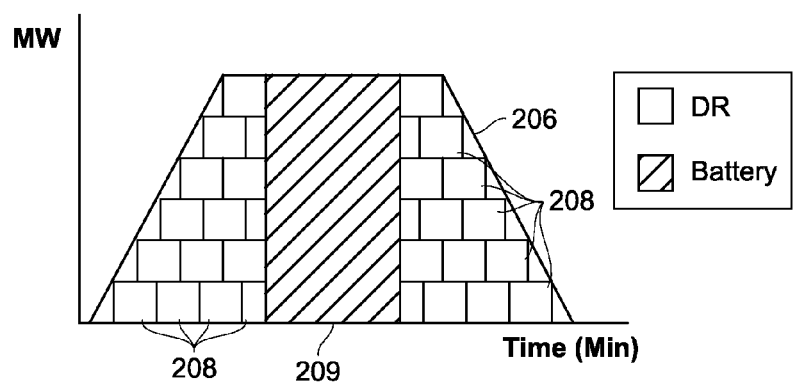

FIG. 7 illustrates a graph where the example objective may include maximization of total savings subject to a load shape constraint 206. In this case, demand response events 208 and energy storage event 209 are selected to meet this given objective and load shape constraint.

Figure 8:
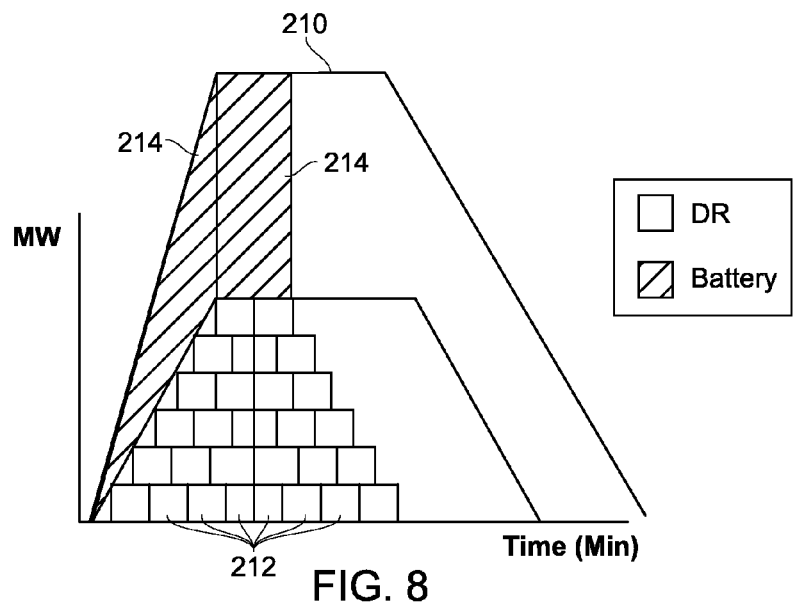

FIG. 8 illustrates a graph where the example objective includes maximization of total savings subject to both load shape and ramping rate constraints 210. In this case, demand response events 212 and energy storage events 214 are selected to meet the given objective and the constraints.

Returning to FIG. 2, step 22 allows performing a dispatch consistent with the determined control strategy. Step 24 allows updating an events database (e.g., database 134 (FIG. 1)), such as may allow keeping track of demand response and/or energy storage events, which have been performed. Similarly, parameters database 136 may be updated. This database may be used for evaluating the aggregate of hybrid operational capabilities, which remain subsequent to the performed dispatch, as indicated in step 24, prior to stop step 28.

Figure 3:
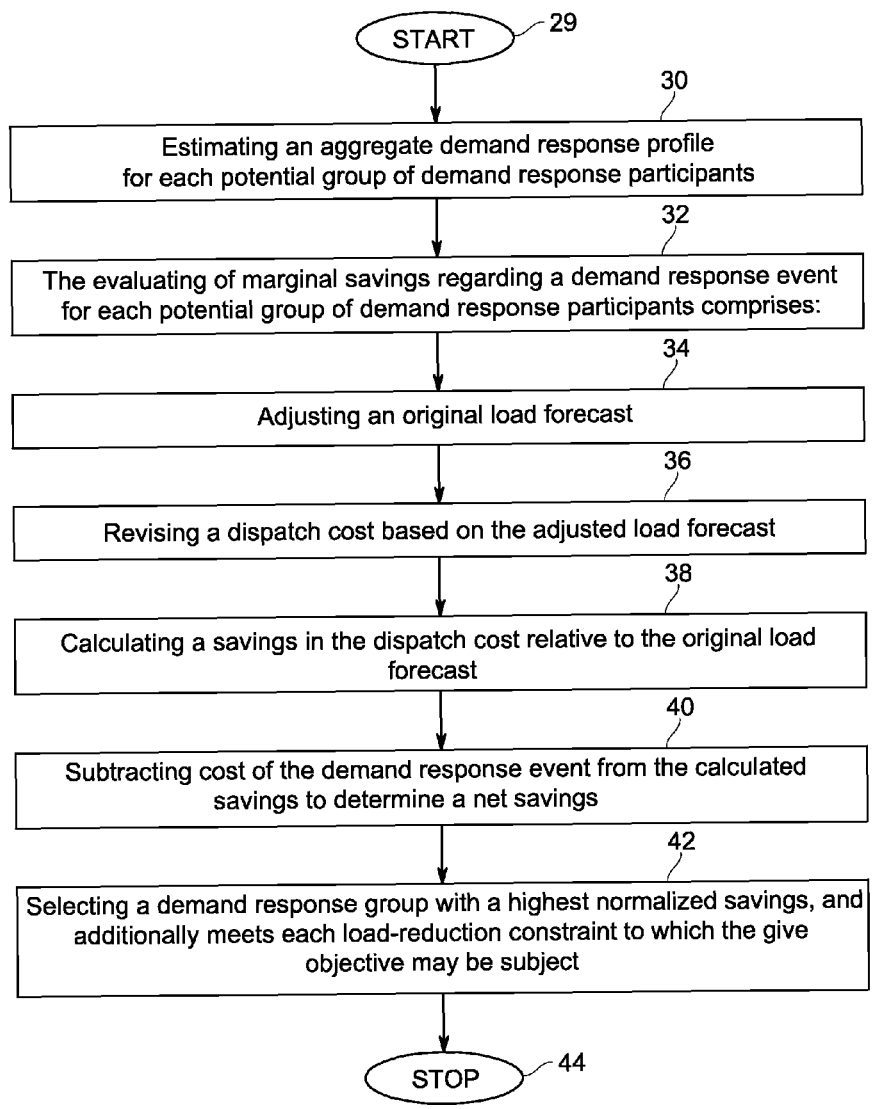

FIG. 3 is a flowchart providing further example details regarding the evaluation of marginal savings in connection with a demand response event (e.g., step 16 in FIG. 2). Subsequent to start step 29, step 30 allows estimating at least one aggregate demand response profile for each potential group of demand response participants. Step 32 and remainder steps shown in FIG. 3, indicate that the evaluating of marginal savings regarding a demand response event for each potential group of demand response participants includes the following: Based on a respective aggregate profile of a respective demand response group being evaluated, step 34 allows adjusting an original load forecast. Step 36 allows revising a dispatch cost based on the adjusted load forecast. Step 38 allows calculating a savings in the dispatch cost relative to the original load forecast. Step 40 allows subtracting a cost (e.g., an option or threshold cost) of the demand response event from the calculated savings to determine a net savings, and, prior to stop step 44, step 42 allows selecting a demand response group with a highest normalized savings. It will be appreciated that in the example case where a given objective involves one or more load-reduction constraints, then the selected demand response group would additionally meet each load-reduction constraint to which the given objective may be subject. It is contemplated that in a practical embodiment, the respective response (e.g., load-reduction) profile for each DR group and/or energy storage group may, for example, take multiple profiles, such as may involve multiple shape and/or ramp profiles. In such cases, every such multiple profiles may be considered to determine the best economic savings while appropriately meeting any applicable load-reduction constraints.

Figure 4:
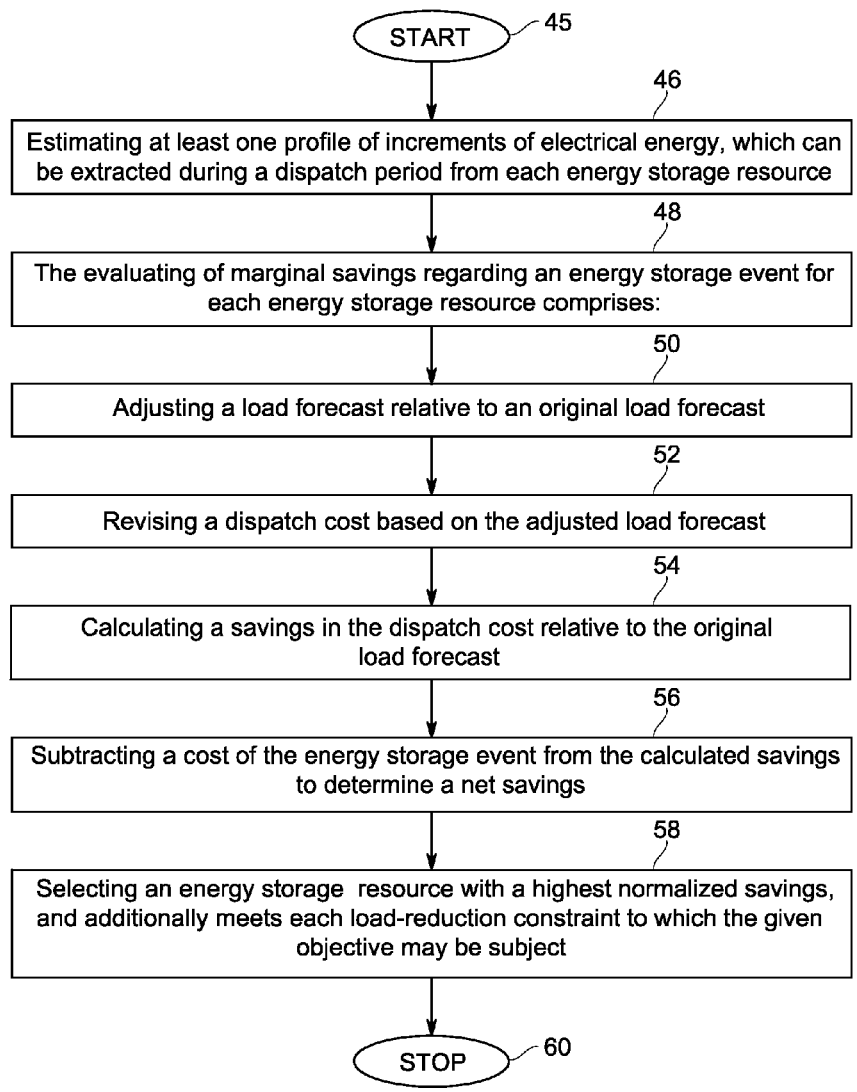

FIG. 4 is a flowchart providing further example details regarding the evaluation of marginal savings in connection with an energy storage event (e.g., step 18 in FIG. 2). Subsequent to step 45, step 46 allows estimating at least one profile of increments of electrical energy, which can be extracted during a dispatch period from each energy storage resource or groups of energy storage resources. Step 48 and remainder steps shown in FIG. 4, indicate that the evaluating of marginal savings regarding an energy storage event for each energy storage resource includes the following: Based on a respective estimated increment of electrical energy from a respective energy storage resource being evaluated, step 50 allows adjusting an original load forecast. Step 52 allows revising a dispatch cost based on the adjusted load forecast. Step 54 allows calculating a savings in the dispatch cost relative to the original load forecast. Step 56 allows subtracting a cost of the energy storage event from the calculated savings to determine a net savings, and, prior to step 60, step 58 allows selecting an energy storage resource with a highest normalized savings. It will be appreciated that in the example case where a given objective involves one or more load-reduction constraints, then the selected energy storage resource, would additionally meet each load-reduction constraint to which the given objective may be subject.

Figure 5:
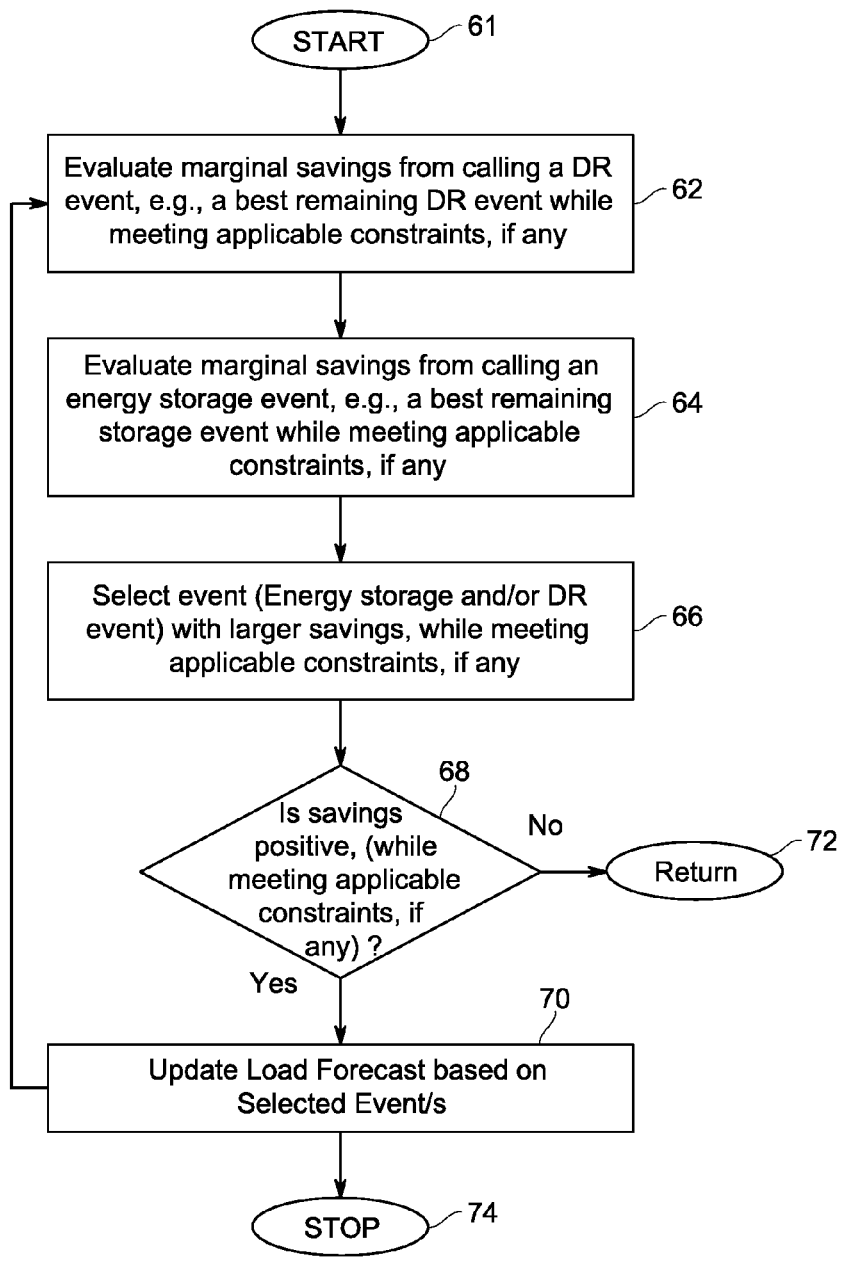

FIG. 5 may be used to appreciate iterative aspects, which may be involved in a method embodying aspects of the present invention. Subsequent to step 61, step 62 allows evaluating marginal savings, which may result from calling a DR event, such as a best remaining DR event, (analogous to step 16 in FIG. 2, as further elaborated in the flow chart shown in FIG. 3). Step 64 allows evaluating marginal savings, which may result from calling an energy storage event, such as a best remaining storage event, (analogous to step 18 in FIG. 2, as further elaborated in the flow chart shown in FIG. 4). Step 66 allows selecting an event (e.g., energy storage and/or DR event), while meeting applicable load-reduction constraints, if any. Decision step 68 allows determining whether savings resulting from the selected event/s results in positive savings, while meeting applicable load-reduction constraints. If no positive savings (or any applicable constraints cannot be met), then one proceeds to step 72. Conversely, if positive savings (and any applicable constraints are still realizable), then one proceeds to step 70 to update a load forecast based on the selected event/s and then proceeds to step 62 to perform a next iteration to determine a next determination of event/s to perform, which still may result in positive savings while meeting applicable load-reduction constraints, if any. The description below will proceed to describe some basic examples, which may be helpful to conceptualize certain advantages, which may be realizable by a method and system embodying aspects of the present invention.

Figure 9:
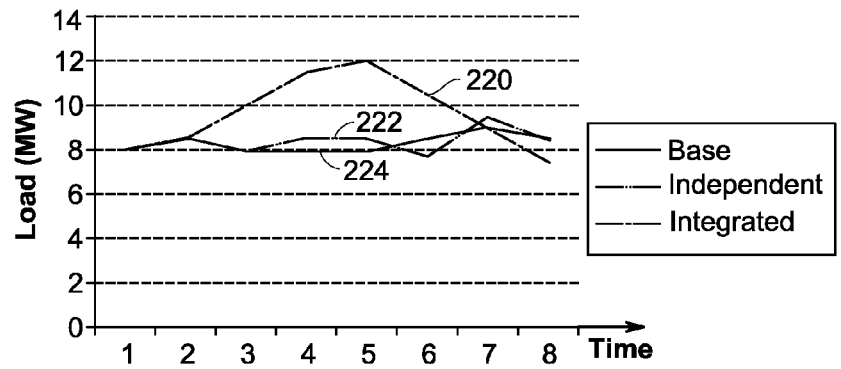
FIG. 9 is a graphical representation of respective plots indicative of an example time-varying grid load under three example scenarios.

Comparative Dispatch Examples for Conceptualizing a Desired Load Reduction Thru Co-Optimized Integration of Energy Storage and DR Resources FIG. 9 is a graphical representation of respective plots indicative of a time-varying grid load under three example scenarios. Plot 220 corresponds to a first example scenario with no utilization of DR or energy storage resources. A listing of the values for plot 220 is shown in the column designated "Base" in Table 1 below. Plot 222 corresponds to a second example scenario with independent (non-integrated) utilization of DR and energy storage resources. A listing of the values for plot 222 is shown in the column designated "Ind." in Table 1 below. Plot 224 corresponds to a third example scenario with co-optimized use of DR and energy storage resources in accordance with aspects of the present invention. A listing of the values for plot 224 is shown in the column designated "Int." in Table 1 below.

Figure 10:
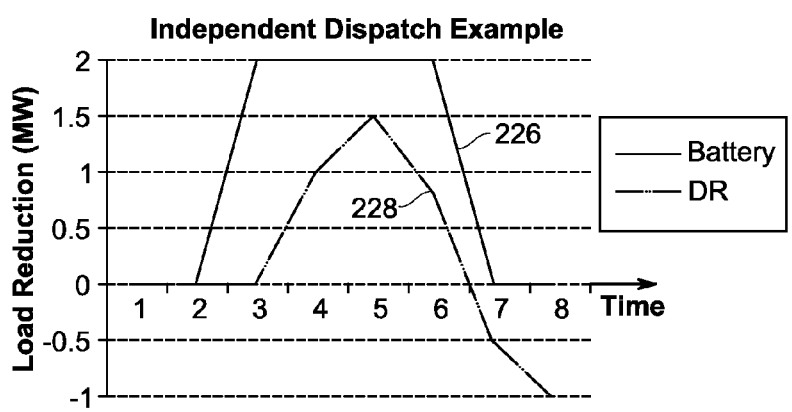
FIG. 10 is a graphical representation of respective plots indicative of respective load reductions achieved under two example events involving non-integrated dispatch of energy storage and DR resources.

FIG. 10 is a graphical representation of respective plots indicative of respective load reductions achieved under two example events involving non-integrated use of energy storage and DR resources. This corresponds to the load values shown in plot 222 in FIG. 9. Plot 226 corresponds to an energy storage event and plot 228 corresponds to a DR event. A listing of the values for plot 226 is shown in the column designated "Battery" under the "Non-integrated Dispatch" heading in Table 1 below. A listing of the values for plot 228 is shown in the column designated "DR" under the "Non-integrated Dispatch" heading in Table 1 below.

Figure 11:
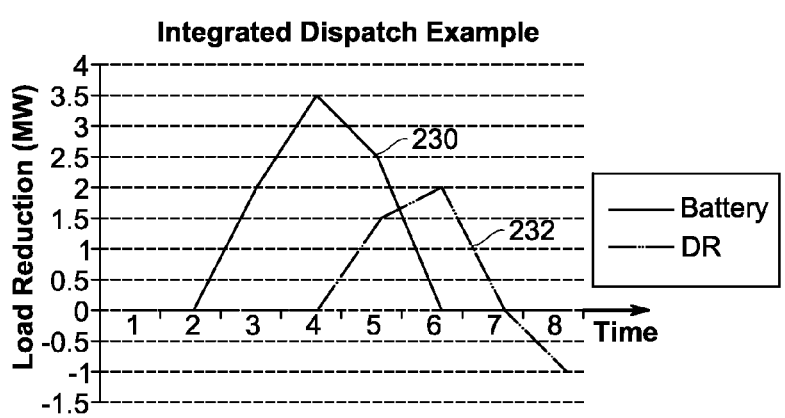
FIG. 11 is a graphical representation of respective plots indicative of respective load reductions achieved under two example events involving co-optimized dispatch of energy storage and DR resources, as may embody aspects of the present invention.

FIG. 11 is a graphical representation of respective plots indicative of a respective load reduction achieved under two example events involving integrated use of energy storage and DR resources, in accordance with aspects of the present invention. This corresponds to the load values shown in plot 224 in FIG. 9. Plot 230 corresponds to an energy storage event and plot 232 corresponds to a DR event. A listing of the values for plot 230 is shown in the column designated "Battery" under the "Integrated Dispatch" heading in Table 1 below. A listing of the values for plot 232 is shown in the column designated "DR" under the "Integrated Dispatch" heading in Table 1 below. It can be appreciated from FIGS. 9-11 and Table 1 that the integrated use of DR and energy storage resources leads to a maximum load reduction, which can be translated into maximal generation savings for the utility.

TABLE 1

| | Baseline Load (MW) | | | Load Reduction Non-integrated Dispatch | | | Load Reduction Integrated Dispatch | | |
|---|---|---|---|---|---|---|---|---|---|
| Time | Base | Ind. | Int. | Battery | DR | Total | Battery | DR | Total |
| 1 | 8 | 8 | 8 | 0 | 0 | 0 | 0 | 0 | 0 |
| 2 | 8.5 | 8.5 | 8.5 | 0 | 0 | 0 | 0 | 0 | 0 |
| 3 | 10 | 8 | 8 | 2 | 0 | 2 | 2 | 0 | 2 |
| 4 | 11.5 | 8.5 | 8 | 2 | 1 | 3 | 3.5 | 0 | 3.5 |
| 5 | 12 | 8.5 | 8 | 2 | 1.5 | 3.5 | 2.5 | 1.5 | 4 |
| 6 | 10.5 | 7.7 | 8.5 | 2 | 0.8 | 2.8 | 0 | 2 | 2 |
| 7 | 9 | 9.5 | 9 | 0 | −0.5 | −0.5 | 0 | 0 | 0 |
| 8 | 7.5 | 8.5 | 8.5 | 0 | −1 | −1 | 0 | −1 | −1 |

For simplicity of conceptual explanation, the foregoing examples do not involve any relative marginal cost analysis between the DR and the energy storage events. This analytical framework is introduced in the examples to be described below.

Comparative Dispatch Examples for Conceptualizing a Maximum Savings Thru Co-Optimized Integration of Energy Storage and DR Resources (Including Relative Example Costs of Energy Storage and DR Resources)

One or more energy storage resources may be called to dispatch varying amounts of electrical energy, depending on the magnitude of peak reduction, which may be desired. For example, let us presume electrical energy from such resources may be dispatched in blocks of fixed amounts of electrical energy (e.g., multiples of KWh), as indicated in the first column (leftmost column) of Table 2 below.

In connection with an energy storage event, the cost (e.g., charging/discharging) regarding utilization of the energy storage resource may be considered to be linear relative to the amount of electrical energy being charged/discharged by the energy storage resource. Let us further presume the cost of dispatching one block of electrical energy is $5 units per block, as indicated in the second column of Table 2.

In connection with a DR event, let us presume potential DR participants are assigned to groups, where each group may be able to curtail one block of electrical energy. Since the number of allowable DR events is limited, the "cost" of using each additional DR group for a given event will progressively increase. For example, the first DR group may cost 3 $ units, the second DR group may cost 4 $ units. Thus, the combined use of the first two DR groups would be 7 $ units, as indicated in the third column of Table 2.

TABLE 2

| Total Load Reduction Needed (e.g., blocks of energy) | Energy Storage Cost (e.g., $ units) | DR Cost (e.g., $ units) |
|---|---|---|
| 1 | 5 | 3 |
| 2 | 10 | 3 + 4 = 7 |
| 3 | 15 | 3 + 4 + 5 = 12 |
| 4 | 20 | 3 + 4 + 5 + 6 = 18 |
| 5 | 25 | 3 + 4 + 5 + 6 + 7 = 25 |
| 6 | 30 | 3 + 4 + 5 + 6 + 7 + 8 = 33 |

Table 3 below lists four example scenarios, based on the relative costs listed on Table 2. This allows an example relative comparison of costs, which may be achieved when DR and energy storage resources are co-optimally integrated in accordance with aspects of the present invention (example case 4). This example scenario presumes maximization of savings, without regard to any load-reduction constraints. Example case 1 involves just energy storage resources. Example case 2 involves just DR resources. Example case 3 involves either DR or energy storage resources (no integrated use of DR and energy storage resources).

TABLE 3

| Total Reduction Needed (in number of blocks) | Example Case 1: Cost of Energy Storage Alone (e.g., $ units) | Example case 2: Cost of DR Alone (e.g., $ units) | Example Case 3: Using Either DR or Storage resource, no integration | Example Case 4: Using Co-optimization of DR and Storage Resources |
|---|---|---|---|---|
| 1 | 5 | 3 | 3 (DR) | 3 (1 block of DR) |
| 2 | 10 | 7 | 7 (DR) | 7 (2 blocks of DR) |
| 3 | 15 | 12 | 12 (DR) | 12 {(3 blocks of DR) OR (2 blocks of DR + 1 Block of Storage)} |
| 4 | 20 | 18 | 18 (DR) | 17 {(3 blocks of DR + 1 block of Storage) OR (2 blocks of DR + 2 blocks of Storage)} |
| 5 | 25 | 25 | 25 (DR or Storage) | 22 {(3 blocks of DR + 2 blocks of Storage) OR (2 block of DR + 3 blocks of Storage)} |
| 6 | 30 | 33 | 30 (Storage) | 27 {(3 blocks of DR + 3 blocks of Storage) OR (2 blocks of DR + 4 blocks of Storage)} |
| Average Cost (e.g., $ units) | 17.5 | 16.3 | 15.8 | 14.7 |

Presuming one were to implement each of the events listed for each of the four example cases, the last row indicates that example case 4 (co-optimized utilization of DR and energy storage resources) results in the lowest average costs.

It will be appreciated that aspects of an example inventive system, as may be used to provide co-optimized utilization of demand response and energy storage resources in an electrical grid system, and methods disclosed herein may be implemented by any appropriate processor system using any appropriate programming language or programming technique. The system can take the form of any appropriate circuitry, such as may involve a hardware embodiment, a software embodiment or an embodiment comprising both hardware and software elements. In one embodiment, the system may be implemented by way of software and hardware (e.g., processor, sensors, etc), which may include but is not limited to firmware, resident software, microcode, etc. Furthermore, parts of the processor system can take the form of a computer program product accessible from a computer-usable or computer-readable medium providing program code for use by or in connection with a computer or any instruction execution system. Examples of computer-readable media may include non-transitory tangible computer-readable media, such as a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. An interface display may be a tablet, flat panel display, PDA, or the like.

In one example embodiment, a processing system suitable for storing and/or executing program code may include in one example at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A method to provide co-optimized utilization of demand response and energy storage resources in an electrical grid system, comprising:
obtaining a grid system load;
estimating a dispatch cost in connection with the grid system load from energy supply cost curves stored in a database;
evaluating a marginal savings relative to the dispatch cost if a demand response event is performed, wherein the evaluating of marginal savings regarding a demand response event comprises estimating at least one aggregate demand response profile for each potential group of demand response participants, wherein the evaluating of marginal savings regarding a demand response event for each potential group of demand response participants comprises
based on a respective aggregate profile of a respective demand response group being evaluated, adjusting an original load forecast;
revising a dispatch cost based on the adjusted load forecast;
calculating a savings in the dispatch cost relative to the original load forecast;
subtracting an option or threshold cost of the demand response event from the calculated savings to determine a net savings; and
selecting a demand response group with a highest normalized savings, which meets each load-reduction constraint to which the given objective may be subject;
evaluating a marginal savings relative to the dispatch cost if an energy storage event is performed;
determining a control strategy to perform a dispatch comprising a demand response event and/or an energy storage event, which is selected to co-optimize an integrated utilization of the demand response and energy storage resources to meet a given objective based at least in part on the respective marginal savings of the demand response event and/or the energy storage event, wherein said control strategy is further based on parameters indicative of an aggregate of hybrid operational capabilities resulting from the integrated utilization of the demand response and energy storage resources relative to the given objective; and
performing a dispatch consistent with the determined control strategy.

2. The method of claim 1, wherein the given objective comprises a maximization of total savings in connection with the performed dispatch.

3. The method of claim 1, wherein the given objective comprises a maximization of total savings in connection with the performed dispatch subject to at least one or more load-reduction constraints.

4. The method of claim 3, wherein the load-reduction constraint is selected from the group consisting of a ramping rate, a defined load shape, a defined load limit, and a combination of the foregoing constraints.

5. The method of claim 1, further comprising, evaluating parameters indicative of the aggregate of hybrid operational capabilities, which remain subsequent to the performed dispatch.

6. The method of claim 1, wherein the evaluating of marginal savings regarding an energy storage event comprises estimating at least one profile of increments of electrical energy, which can be extracted during a dispatch period from each energy storage resource.

7. The method of claim 6, wherein the evaluating of marginal savings regarding an energy storage event for each energy storage resource comprises:
based on an estimated increment of electrical energy from a respective energy storage resource being evaluated, adjusting a load forecast relative to an original load forecast;
revising a dispatch cost based on the adjusted load forecast;
calculating a savings in the dispatch cost relative to the original load forecast;
subtracting a cost of the energy storage event from the calculated savings to determine a net savings;
selecting an energy storage resource with a highest normalized savings.

8. The method of claim 7, wherein the selecting further comprises selecting an energy storage resource, which meets each load-reduction constraint to which the given objective may be subject.

9. The method of claim 7, wherein the control strategy is further configured to determine a charging schedule for a selected energy resource.

10. The method of claim 1, wherein the control strategy is configured to determine a quantitative proportion of demand response and energy storage resources and a temporal schedule for the demand response event and/or the energy storage event.

11. The method of claim 5, further comprising iteratively performing the evaluating of marginal savings to respectively determine a next demand response event and/or a next energy storage event to perform, and dynamically adjusting the control strategy based on the respective marginal savings of the next demand response and/or the next energy storage event, wherein said control strategy is further dynamically adjusted based on the parameters indicative of the aggregate of hybrid operational capabilities, which remain available.

12. The method of claim 1, wherein the control strategy comprises determining a sequence of dispatches to be performed over a time horizon comprising a corresponding sequence of events comprising at least one of a demand response event and an energy storage event.

13. A system to provide co-optimized utilization of demand response and energy storage resources in an electrical grid system, the system comprising:
a module to obtain a grid system load;
a module to estimate a dispatch cost in connection with the grid system load from energy supply cost curves stored in a database;
a module to evaluate a marginal savings relative to the dispatch cost if a demand response event is performed, wherein the module to evaluate marginal savings regarding a demand response event comprises a module configured to estimate at least one aggregate demand response profile for each potential group of demand response participants, wherein the module to evaluate marginal savings regarding a demand response event for each potential group of demand response participants comprises:
a module to adjust an original load forecast based on a respective aggregate profile of a respective demand response group being evaluated;
a module to revise a dispatch cost based on the adjusted load forecast;

a module to calculate a savings in the dispatch cost relative to the original load forecast;

a module to subtract an option or threshold cost of the demand response event from the calculated savings to determine a net savings; and a module to select a demand response group with a highest normalized savings, which meets each load-reduction constraint to which the given objective may be subject;

a module to evaluate a marginal savings relative to the dispatch cost if an energy storage event is performed;

a controller comprising circuitry configured to determine a control strategy to perform a dispatch comprising a demand response event and/or an energy storage event, which is selected to co-optimize an integrated utilization of the demand response and energy storage resources to meet a given objective based at least in part on the respective marginal savings of the demand response event and/or the energy storage event, wherein said control strategy is further based on parameters indicative of an aggregate of hybrid operational capabilities resulting from the integrated utilization of the demand response and energy storage resources relative to the given objective; and a module to perform a dispatch consistent with the determined control strategy.

14. The system of claim 13, wherein the given objective comprises a maximization of total savings in connection with the performed dispatch.

15. The system of claim 13, wherein the given objective comprises a maximization of total savings in connection with the performed dispatch subject to at least one or more load-reduction constraints.

16. The system of claim 15, wherein the load-reduction constraint is selected from the group consisting of a ramping rate, a defined load shape, a defined load limit, and a combination of the foregoing constraints.

17. The system of claim 13, further comprising a module to evaluate parameters indicative of the aggregate of hybrid operational capabilities, which remain subsequent to the performed dispatch.

18. The system of claim 13, wherein the module to evaluate marginal savings regarding an energy storage event comprises a module to estimate at least one profile of increments of electrical energy, which can be extracted during a dispatch period from each energy storage resource.

19. The system of claim 18, wherein the module to evaluate marginal savings regarding an energy storage event for each energy storage resource comprises:

a module to adjust a load forecast relative to an original load forecast, based on an estimated increment of electrical energy from a respective energy storage resource being evaluated;

a module to revise a dispatch cost based on the adjusted load forecast;

a module to calculate a savings in the dispatch cost relative to the original load forecast;

a module to subtract a cost of the energy storage event from the calculated savings to determine a net savings; and a module to select an energy storage resource with a highest normalized savings.

20. The system of claim 19, wherein the module to select the energy storage resource is configured to select an energy storage resource, which meets each load-reduction constraint to which the given objective may be subject.

21. The system of claim 18, wherein the control strategy is further configured to determine a charging schedule for a selected energy resource.

22. The system of claim 13, wherein the control strategy is configured to determine a quantitative proportion of demand response and energy storage resources and a temporal schedule for the demand response event and/or the energy storage event.

23. The system of claim 13, wherein the controller is configured to iteratively perform a respective evaluation of marginal savings to determine a next demand response event and/or a next energy storage event to perform, and dynamically adjust the control strategy based on the respective marginal savings of the next demand response and/or the next energy storage event, wherein said control strategy is further dynamically adjusted based on the parameters indicative of the aggregate of hybrid operational capabilities, which remain available.

* * * * *